(12) United States Patent
Guo et al.

(10) Patent No.: US 9,833,753 B2
(45) Date of Patent: Dec. 5, 2017

(54) FLUID-DRIVEN STIRRING APPARATUS

(71) Applicant: Guangdong Xinbao Electrical Appliances Holdings Co., Ltd., Foshan (CN)

(72) Inventors: Jiangang Guo, Foshan (CN); Mingjian Cai, Foshan (CN); Jinru Lin, Foshan (CN)

(73) Assignee: Guangdong Xinbao Electrical Appliances Holdings Co., Ltd. (CN)

( * ) Notice: Subject to any disclaimer, the term of this patent is extended or adjusted under 35 U.S.C. 154(b) by 351 days.

(21) Appl. No.: 14/629,636

(22) Filed: Feb. 24, 2015

(65) Prior Publication Data
US 2015/0265093 A1 Sep. 24, 2015

(30) Foreign Application Priority Data

Mar. 21, 2014 (CN) .................... 2014 2 0132590 U
Sep. 1, 2014 (CN) .......................... 2014 1 0441522

(51) Int. Cl.
| | |
|---|---|
| *A47J 43/044* | (2006.01) |
| *A47J 43/12* | (2006.01) |
| *B01F 15/00* | (2006.01) |
| *B01F 3/04* | (2006.01) |
| *B01F 7/32* | (2006.01) |
| *A47J 31/44* | (2006.01) |

(52) U.S. Cl.
CPC ......... *B01F 3/04453* (2013.01); *A47J 43/044* (2013.01); *A47J 43/12* (2013.01); *B01F 7/32* (2013.01); *B01F 15/00525* (2013.01); *B01F 15/00545* (2013.01); *A47J 31/4489* (2013.01); *B01F 2015/00584* (2013.01); *B01F 2215/0006* (2013.01)

(58) Field of Classification Search
CPC .. B01F 3/04453; B01F 15/00545; B01F 7/32; B01F 2015/00584; B01F 2215/00; B01F 2015/0011; B01F 15/00525; B01F 2215/0006; A47J 43/044; A47J 43/12; A47J 31/4489
USPC .................. 366/168.2, 250, 325.6
See application file for complete search history.

(56) References Cited

U.S. PATENT DOCUMENTS

| | | | |
|---|---|---|---|
| 300,170 A | * | 6/1884 | Van Riper et al. ... B01F 5/0218 222/129.3 |
| 1,200,301 A | * | 10/1916 | Bigelow ................... B01F 7/00 366/250 |

(Continued)

FOREIGN PATENT DOCUMENTS

GB 887930 * 1/1962

*Primary Examiner* — Charles Cooley
(74) *Attorney, Agent, or Firm* — Lerner, David, Littenberg, Krumholz & Mentlik, LLP

(57) ABSTRACT

A fluid-driven stirring apparatus includes a fluid introduction passageway, a fluid chamber connectable to the fluid introduction passageway, a container for accommodating liquid to be stirred, and a stirring assembly. The stirring assembly includes a driving impeller arranged in the fluid chamber, a stirring shaft fixedly connected with the driving impeller and extending through the fluid chamber into the container, and a stirring member arranged on the stirring shaft and adjacent to the bottom of the container. Thus, the fluid drives the driving impeller to rotate the stirring shaft, so that the stirring member can stir the liquid in the container.

9 Claims, 1 Drawing Sheet

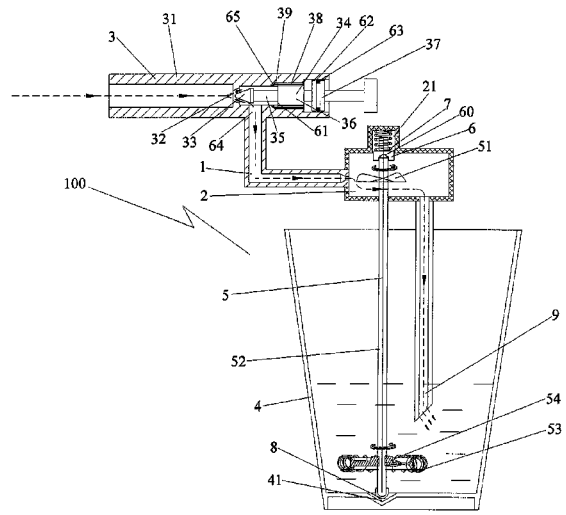

(56) References Cited

U.S. PATENT DOCUMENTS

| | | | | |
|---|---|---|---|---|
| 1,354,230 A * | 9/1920 | Walther | ............. | A47J 43/09 366/250 |
| 1,375,338 A * | 4/1921 | Werner | ............. | A47J 43/09 366/250 |
| 1,454,223 A * | 5/1923 | Poor | ............. | A47J 43/09 366/250 |
| 1,492,229 A * | 4/1924 | Thompson | ............. | A47J 43/09 366/250 |
| 1,784,416 A * | 12/1930 | Brockmann | ............. | B01F 7/0015 366/250 |
| 1,829,812 A * | 11/1931 | Rose | ............. | A47J 43/09 366/169.1 |
| 2,103,888 A * | 12/1937 | Bowen | ............. | B01F 7/007 137/47 |
| 2,142,237 A * | 1/1939 | Canady | ............. | B01F 11/00 366/111 |
| 2,712,926 A * | 7/1955 | Von Elm | ............. | 366/248 |
| 6,558,035 B2 * | 5/2003 | Lane | ............. | A47J 43/08 366/129 |
| 6,749,331 B1 * | 6/2004 | Hughes | ............. | B01F 7/161 366/191 |
| 6,764,704 B2 * | 7/2004 | Schub | ............. | A47J 43/082 366/129 |
| 8,196,905 B2 * | 6/2012 | Bodum | ............. | A47J 43/1093 261/91 |
| 9,609,978 B2 * | 4/2017 | Castelli | ............. | A47J 31/4485 |
| 2003/0177914 A1 * | 9/2003 | Schub | ............. | A47J 43/082 99/348 |
| 2004/0208081 A1 * | 10/2004 | Hughes | ............. | B01F 7/161 366/191 |
| 2005/0029685 A1 * | 2/2005 | Zhao | ............. | A47J 43/044 261/87 |
| 2009/0266240 A1 * | 10/2009 | Elissen | ............. | A47J 27/004 99/323.3 |
| 2012/0000372 A1 * | 1/2012 | Vanni | ............. | A47J 31/4489 99/323.1 |
| 2012/0186462 A1 * | 7/2012 | Breust | ............. | A47J 43/0705 99/466 |
| 2015/0265093 A1 * | 9/2015 | Guo | ............. | B01F 3/04453 261/64.1 |
| 2015/0289710 A1 * | 10/2015 | van Druten | ............. | A47J 31/4485 426/115 |
| 2015/0297020 A1 * | 10/2015 | Castelli | ............. | A47J 31/4489 99/287 |

* cited by examiner

FLUID-DRIVEN STIRRING APPARATUS

CROSS-REFERENCE TO RELATED REFERENCES

The present application claims priority from Chinese Application No. CN 201420132590.9, filed Mar. 21, 2014 and Chinese Application No. 201410441522.5 filed Sep. 1, 2014, all of which are hereby incorporated herein by reference.

TECHNICAL FIELD

The present disclosure relates to the technical field of household appliance. Specifically, it relates to a fluid-driven stirring apparatus.

TECHNICAL BACKGROUND

Beverages, such as cappuccino and latte etc., are covered with a layer of milk foam made by a milk foaming machine. Such a milk foaming machine usually comprises one or more stirring members immersed in milk or milk-containing liquid for stirring the milk or milk-containing liquid, thereby foaming the milk or milk-containing liquid.

Currently, a milk foaming machine driven electromechanically is commonly used. A motor disposed inside the milk foaming machine drives a stirring paddle to rotate, in order to stir the milk and obtain milk foam. However, this type of milk foaming machine can only work with the power on. In the meantime, such a milk forming machine has complex construction and is difficult to be assembled. Therefore, the process of manufacturing the milk foaming machine is complex, and the production cost thereof is high.

SUMMARY OF THE INVENTION

In order to solve the above problem, the present disclosure provides a fluid-driven stirring apparatus which uses fluid source to drive the stirring member in rotation, thereby foaming the milk or milk-containing liquid. The stirring apparatus according to the present disclosure is advantageous in simple structure and energy saving.

The fluid-driven stirring apparatus according to the present disclosure comprises:
  a fluid introduction passageway,
  a fluid chamber connectable to the fluid introduction passageway,
  a container for accommodating liquid to be stirred,
  a stirring assembly comprising a driving impeller arranged in the fluid chamber, a stirring shaft fixedly connected with the driving impeller and extending through the fluid chamber into the container, and a stirring member arranged on the stirring shaft and adjacent to the bottom of the container, wherein the fluid drives the driving impeller to rotate the stirring shaft, so that the stirring member can stir the liquid in the container.

Accordingly, the stirring apparatus configured in this manner drives the driving impeller to rotate through fluid, so that the stirring member can stir the liquid to be stirred, such as milk or milk-containing liquid, thereby achieving the purpose of foaming the liquid. In the stirring apparatus according to the present disclosure, it is unnecessary to drive the stirring shaft in an electromechanical manner, and thus energy can be saved. In the meantime, no motor is arranged in the apparatus, so that the structure of the machine can be simplified, and the production cost can be reduced.

An adjustment assembly is arranged in the fluid introduction passageway upstream of the fluid chamber. The adjustment assembly comprises a cylindrical adjustment base, an adjustment orifice located in the adjustment base, and an adjustment head that can be engaged with the adjustment orifice. In this manner, the flow of fluid entering the fluid chamber through the fluid introduction passageway can be adjusted by regulating the relative position between the adjustment orifice and the adjustment head. As a result, the stirring apparatus can adjust the flow of fluid entering the fluid chamber so as to satisfy different needs, thereby expanding the range of application of the stirring apparatus and facilitating the usage thereof.

In an embodiment, the adjustment orifice is structured as a tapered hole having a cross section gradually increasing from a first end to a second end thereof, and the adjustment head is disposed at the second end of the adjustment orifice, and structured as a conical body which is movable along an axial direction of the adjustment orifice. An adjustment head of this design can move along an axial direction of the adjustment orifice so as to cooperate therewith, thereby achieving the regulation of the flow of fluid. The structure of the adjustment orifice is simple and easy to be implemented.

In an embodiment, the adjustment assembly further comprises a connecting rod extending out of the adjustment base from the adjustment head to the second end along an axial direction thereof. The connecting rod is in threaded connection with the adjustment base, so as to drive the adjustment head to move along an axial direction of itself. A fluid orifice in communication with the fluid chamber is disposed on the adjustment base, and located between the adjustment orifice and the threaded portion of the connecting rod. By means of such an arrangement, the adjustment head can move forward or backward along an axial direction of the connecting rod to engage with the adjustment orifice by rotating the connecting rod, so as to realize the adjustability of the flow of fluid. Such an arrangement is easy and convenient to be operated.

In an embodiment, a sealing member is disposed between the connecting rod and the adjustment base, and located at a second end of the fluid orifice. In a preferred embodiment, the sealing member is an O-ring seal. Such an arrangement can prevent the fluid upstream of the adjustment assembly from leaking out from the clearance between the adjustment base and the connecting rod, thereby ensuring that the fluid enters the fluid chamber after passing through the fluid orifice.

In an embodiment, a first limit tapered hole for accommodating a lower end of the stirring shaft is disposed at an interior bottom of the container, and the lower end of the stirring shaft is structured as a conical tip or a hemispheric tip or a spherical tip so as to adapt to the first limit taper hole. The first limit taper hole can correct the lower end of the stirring shaft to guarantee a proper alignment between the upper portion and the lower portion of the stirring shaft, and also limit the swing of the stirring shaft. In the meantime, this structure is simple and easy to be implemented.

In an embodiment, an elastic wear-resistant member is arranged to cover the lower end of the stirring shaft, or an elastic wear-resistant member is embedded in a surface of an inner wall of the first limit tapered hole. Such arrangement can reduce the vibration and friction between the stirring shaft and the first limit tapered hole, and guarantee a smooth and steady operation of the stirring apparatus.

In an embodiment, an adjustment mounting block movable along an axial direction of the stirring shaft and a biasing member acting upon the installation block are disposed in the fluid chamber. A second limit tapered hole is disposed on the adjustment mounting block, and an upper end of the stirring shaft is structured as a conical tip or a hemispheric tip or a spherical tip passing through the driving impeller so as to adapt to the second limit tapered hole. The second limit tapered hole can correct the upper end of the stirring shaft to guarantee a proper alignment between the upper portion and the lower portion of the stirring shaft. In the meantime, the biasing member can buffer the run-out of the stirring shaft. This structure is simple and easy to be carried out.

Preferably, the stirring member is an annular spiral spring or a coil spring. This structure is simple and easy to be implemented. In the meantime, by stirring milk or milk-containing liquid with an annular spiral spring or a coil spring, the milk can be rapidly foamed and taste well.

The apparatus further comprises a fluid tube, one end thereof being connected to the fluid chamber and the other end thereof being immerged in the liquid to be stirred. Such arrangement enables the fluid to finally enter the container through the fluid chamber and mix with the milk or milk-containing liquid. Therefore the fluid can warm up the milk or milk-containing liquid and improve the foaming rate.

In the present disclosure, the term "first end" refers to an end adjacent to an upstream of the adjustment base, and the term "second end" refers to an end in an opposite direction of the first end and away from the upstream of the adjustment base.

As compared with the prior art, the present disclosure has the following advantages. In the stirring apparatus according to the present disclosure, fluid (such as high temperature steam) is used to drive the driving impeller to rotate the stirring member, so that the stirring member can stir the liquid to be stirred, and thus the motor-driving manner in traditional milk stirring apparatus for stirring the milk-containing fluid can be avoided and electric energy can be saved. In the meantime, milk foaming can also be operated without power supply. In the stirring process, the flow of fluid entering the fluid chamber can be adjusted by the adjustment assembly, thereby regulating the stirring speed of the stirring shaft according to individual demand. While stirring, the milk-containing liquid can be heated. Heating by plate warmer in a traditional stirring apparatus is abandoned, thereby improving the foaming efficiency while saving energy. The engagement of the conical tip of the stirring shaft with the adjustment mounting block and the container corrects for the position of the stirring shaft, guaranteeing a smoother operation of the stirring apparatus and making finer and more uniform milk foam. By arranging an elastic wear-resistant member between the stirring shaft and the container, the vibration and friction therebetween can be reduced, thereby ensuring a smoother and steadier operation of the stirring apparatus. In addition, the stirring apparatus itself has the advantages of simple structure, easy operation, wide range of application, as well as low production cost.

BRIEF DESCRIPTION OF THE DRAWINGS

The present disclosure will be further described in details based on the embodiments and with reference to the accompanying drawing. In which:

FIGURE shows a sectional view of a fluid-driven stirring apparatus according to the present disclosure.

The accompanying drawing is not drawn to actual scale.

DETAILED DESCRIPTION OF THE EMBODIMENTS

The present disclosure will be further described in view of the accompanying drawing.

FIGURE schematically shows a sectional view of a fluid-driven stirring apparatus 100 according to the present disclosure. As shown in FIGURE, the stirring apparatus 100 comprises a fluid introduction passageway 1, a fluid chamber 2 connectable to the fluid introduction passageway 1, a container 4, and a stirring assembly 5. The stirring assembly 5 comprises a driving impeller 51 arranged in the fluid chamber 2, a stirring shaft 52 fixedly connected with the driving impeller 51 and extending through the fluid chamber 2 into the container 4, and a stirring member 53 arranged on the stirring shaft 52 and adjacent to the bottom of the container 4. Liquid to be stirred (milk or milk-containing liquid) is contained in the container 4 and the stirring member 53 is immersed in the liquid to be stirred. Fluid (such as high temperature steam) enters the fluid chamber 2 through the fluid introduction passageway 1 and drives the driving impeller 51 to rotate. The rotation of the driving impeller 51 drives the stirring shaft 52 to rotate, and rotates the stirring member 53 therewith, thereby stirring and foaming the milk or milk-containing liquid.

The objective of foaming milk or milk-containing liquid can be achieved by steam-driving the stirring apparatus 100. Motor driving method for stirring the milk or milk-containing liquid is abandoned, thereby saving energy, as well as foaming the milk even without power supply. In addition, the stirring apparatus 100 has a simple structure, which is cost effective and easy to maintain.

An adjustment assembly 3 is arranged in the fluid introduction passageway 1 upstream of the fluid chamber 2. The adjustment assembly 3 comprises a cylindrical adjustment base 31, an adjustment orifice 32 in the adjustment base 31, and an adjustment head 33 engageable with the adjustment orifice 32. When fluid flows through the adjustment assembly 3, the flow of fluid entering the fluid chamber 2 can be adjusted by regulating the relative position between the adjustment orifice 32 and the adjustment head 33, so that the rotating speed of the driving impeller 51 can be adjusted, thereby satisfying different needs.

According to the present disclosure, the adjustment orifice 32 is configured as a tapered hole having a cross section gradually increasing from a first end to a second end thereof. Correspondingly, the adjustment head 33 is disposed at the second end of the adjustment orifice 32, and structured as a conical body movable along an axial direction of the adjustment orifice 32. The adjustment head 33 engages with the adjustment orifice 32 when moving along the axial direction thereof, so as to block or partially block the adjustment orifice 32, thereby regulating the flow of fluid entering the adjustment assembly 3.

In an embodiment, the adjustment assembly 3 further comprises a connecting rod 34 fixedly connected with the second end of the adjustment head 33 and extending out of the adjustment base 31 from the adjustment head 33 to the second end along an axial direction thereof. The connecting rod 34 is in threaded connection with the adjustment base 31, so that the rotation of the connecting rod 34 can drive the adjustment head 33 to move forward or backward along an axial direction of the connecting rod 34. In this way, the adjustment head 33 can engage with the adjustment orifice 32, thereby realizing the adjustability of the flow of fluid.

Preferably, the connecting rod 34 comprises a first portion 35, a second portion 36, and a third portion 37 that are successively connected with one another along a direction from a first end of the connecting rod 34 to a second end thereof. The diameter of the second portion 36 is larger than that of the first portion 35, and the diameter of the third portion 37 is larger than that of the second portion 36. Correspondingly, a lumen of the adjustment base 31 is structured to match the structure of the connecting rod 34. External thread 38 is arranged on the second portion 36, and can engage with internal thread 39 arranged on the adjustment base 31. A stepped surface 61 is formed between the first portion 35 and the second portion 36 of the connecting rod 34, and engages with a stepped surface 65 formed in the lumen of the adjustment base 31, so as to position the connecting rod 34 along the axial direction.

A fluid orifice 64 in communication with the lumen of the adjustment base 31 is arranged on the adjustment base 31, and located between the adjustment orifice and the internal thread 39 along an axial direction of the adjustment base 31, so that the fluid passing through the adjustment orifice 32 can enter the fluid chamber 2 through the fluid orifice 64.

An annular groove 62 is disposed along a circumferential direction of the third portion 37. A sealing member 63 is arranged in the annular groove 62 so as to seal the space between the connecting rod 34 and the adjustment base 31. Preferably, the sealing member 63 is an O-ring seal. The arrangement of a sealing member can prevent the fluid flowing through the adjustment assembly 3 from leaking out from the space between the adjustment base 31 and the connecting rod 34, and guarantee that the fluid enters the fluid chamber 2 through the fluid orifice 64.

An accommodating part 21 is arranged on top of the fluid chamber 2, inside which an adjustment mounting block 6 is disposed. A biasing member 7 is disposed above the adjustment mounting block 6. Preferably, the biasing member 7 is a spring, with one end thereof abutting against the adjustment mounting block 6 and the other end against a top wall of the accommodating part 21. Thus, by means of the above arrangements, the spring 7 applies force upon the adjustment mounting block 6 along an axial direction of the stirring shaft 52. When an external, upward force is applied upon the adjustment mounting block 6, the adjustment mounting block 6 moves upward along an axial direction of the stirring shaft 52 after overcoming the spring force from the spring 7. After the external force is released, the adjustment mounting block 6 would move downward along an axial direction of the stirring shaft 52 under the force of the compressed spring 7. In this case, the engagement between the adjustment mounting block 6 and the spring 7 can act as buffer for the stirring shaft 52. It should be noted that a limiting member restricting the movement of the adjustment mounting block 6 along an axial direction of the stirring shaft 52 should be arranged. The structure of such a limiting member is obvious for one skilled in the art, and thus will not be described in details.

A first limit tapered hole 41 for accommodating a lower end of the stirring shaft 52 is disposed at an interior bottom of the container 4, and structured as a blind hole on the interior bottom of the container 4. Preferably, the first limit tapered hole 41 is a tapered hole, and the lower end of the stirring shaft 52 is structured as a conical tip or a hemispheric tip or a spherical tip passing through the fluid chamber 2 so as to adapt to the first limit tapered hole 41. A second limit tapered hole 60 is disposed on a bottom surface of the adjustment mounting block 6. Preferably, the second limit tapered hole 60 is a tapered hole and an upper end of the stirring shaft 52 is structured as a conical tip or a hemispheric tip or a spherical tip passing through the driving impeller 51 so as to adapt to the second limit tapered hole 60. The lower end of the stirring shaft 52 is disposed in the first limit tapered hole 41 so as to correct for the lower end of the stirring shaft 52. The upper end of the stirring shaft 52 is disposed in the second limit tapered hole 60 so as to correct for the upper end of the stirring shaft 52. The second limit tapered hole 60 is coaxial with the first limit tapered hole 41, so as to guarantee the proper alignment of the stirring shaft 52 and restrict the swing thereof.

In order to reduce the vibration and friction between the stirring shaft 52 and the first limit tapered hole 41 and guarantee a smooth and steady operation of the stirring apparatus 100, an elastic wear-resistant member 8 is arranged to cover the lower end of the stirring shaft 52. It should be understood that an elastic wear-resistant member (not shown in the drawing) can also be embedded in a surface of an inner wall of the first limit tapered hole 41.

Preferably, the stirring member 53 is an annular spiral spring or a coil spring. The stirring member 53 is fixedly connected with the stirring shaft 52 through a hub-shaped stirring head 54. For example, the stirring head 54 is fixedly connected with the stirring shaft 52, and the stirring member 53 surrounds the stirring head 54 as a sleeve. The stirring head 54 and the stirring member 53 are immersed in the milk-containing liquid together. During operation, the stirring shaft 52 rotates and drives the stirring member 53, which is in a form of an annular spiral spring or a coil spring, to stir and foam the milk, and guarantees uniform milk foam.

The stirring apparatus 100 further comprises a fluid tube 9. One end of the fluid tube 9 is connected with the fluid chamber 2, and the other end thereof is immersed in the liquid to be stirred. Thus, the fluid can finally enter the container 4 through the fluid tube 9 and mix with the milk or milk-containing liquid. The fluid can also heat the fluid to be stirred. Such an arrangement can not only economize the energy and increase the foaming rate, but also foam the milk-containing liquid more uniformly.

The operation of the stirring apparatus 100 will be described in details.

Milk or milk-containing liquid to be foamed is poured into the container 4, and high pressure steam from a steam source (such as a coffee machine) is introduced through the fluid introduction passageway 1. After the high pressure steam passes through the adjustment orifice 32, it enters the fluid chamber 2 through the fluid orifice 64. In the fluid chamber 2, the steam drives the driving impeller 51 to rotate so as to rotate the stirring shaft 52, and further rotate the stirring member 53 therewith. Thus, the stirring member 53 stirs and foams the milk or milk-containing liquid. In the meantime, the steam which drives the driving impeller 51 enters the milk or milk-containing liquid through the fluid tube 9, so as to heat the liquid. The flow of fluid entering the fluid chamber 2 can be adjusted by rotating the connecting rod 34 so as to regulate the relative position between the adjustment orifice 32 and the adjustment head 33.

While the present disclosure have been described with reference to preferred embodiments, various modifications can be made to the present disclosure without departing from the scope and spirit of the present disclosure and components in the present disclosure could be substituted with equivalents. The present disclosure is not limited to the specific embodiments disclosed in the description, but rather includes all technical solutions falling into the scope of the claims.

The invention claimed is:

1. A fluid-driven stirring apparatus, comprising:
a fluid introduction passageway,
a fluid chamber connectable to the fluid introduction passageway,
a container for accommodating liquid to be stirred, and
a stirring assembly, comprising a driving impeller arranged in the fluid chamber, a stirring shaft fixedly connected with the driving impeller and extending through the fluid chamber into the container, and a stirring member arranged on the stirring shaft and adjacent to the bottom of the container,
wherein fluid drives the driving impeller to rotate the stirring shaft, so that the stirring member can stir the liquid in the container, and
wherein an adjustment mounting block movable along an axial direction of the stirring shaft and a biasing member acting upon the adjustment mounting block are disposed in the fluid chamber, and
a first limit tapered hole is disposed on the adjustment mounting block, and an upper end of the stirring shaft is structured as a conical tip or a hemispheric tip or a spherical tip passing through the driving impeller so as to adapt to the first limit tapered hole.

2. The stirring apparatus according to claim 1, wherein an adjustment assembly is arranged in the fluid introduction passageway upstream of the fluid chamber, and
wherein the adjustment assembly comprises a cylindrical adjustment base, an adjustment orifice in the adjustment base, and an adjustment head engageable with the adjustment orifice, so that the flow of fluid entering the fluid chamber through the fluid introduction passageway can be adjusted by regulating the relative position between the adjustment orifice and the adjustment head.

3. The stirring apparatus according to claim 2, wherein the adjustment orifice is structured as a tapered hole having a cross section gradually increasing from a first end to a second end thereof, and
the adjustment head is disposed at the second end of the adjustment orifice, and structured as a conical body which is movable along an axial direction of the adjustment orifice.

4. The stirring apparatus according to claim 3, wherein the adjustment assembly further comprises a connecting rod extending out of the adjustment base from the adjustment head to the second end along an axial direction thereof,
the connecting rod is in threaded connection with the adjustment base, so as to drive the adjustment head to move along an axial direction of itself, and
a fluid orifice in communication with the fluid chamber is disposed on the adjustment base, and located between the adjustment orifice and the threaded portion of the connecting rod.

5. The stirring apparatus according to claim 4, wherein a sealing member is disposed between the connecting rod and the adjustment base, and located at a second end of the fluid orifice.

6. The stirring apparatus according to claim 1, wherein a second limit tapered hole for accommodating a lower end of the stirring shaft is disposed at an interior bottom of the container, and the lower end of the stirring shaft is structured as a conical tip or a hemispheric tip or a spherical tip so as to adapt to the second limit tapered hole.

7. The stirring apparatus according to claim 6, wherein an elastic wear-resistant member is arranged to cover the lower end of the stirring shaft, or an elastic wear-resistant member is embedded in a surface of an inner wall of the first limit taper hole.

8. The stirring apparatus according to claim 1, wherein the stirring element is an annular spiral spring or a coil spring.

9. The stirring apparatus according to claim 1, wherein the apparatus further comprises a fluid tube, one end thereof being connected to the fluid chamber and the other end thereof being immerged in the liquid to be stirred.

* * * * *